United States Patent Office 3,266,375
Patented August 16, 1966

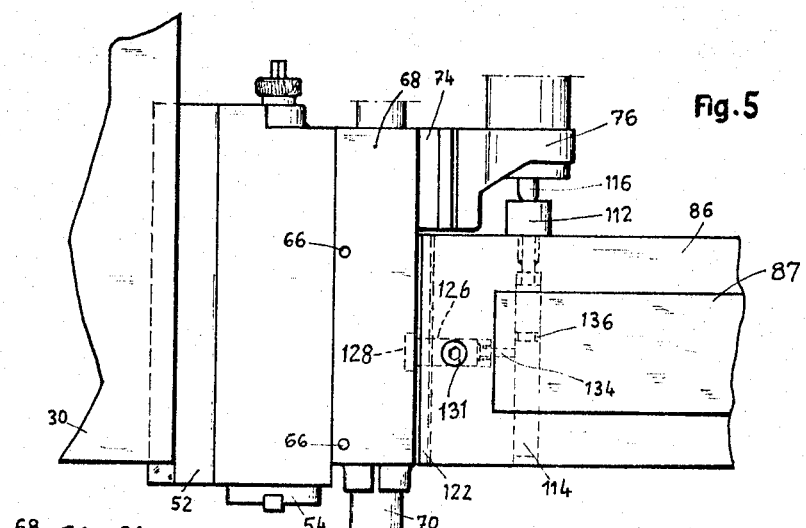
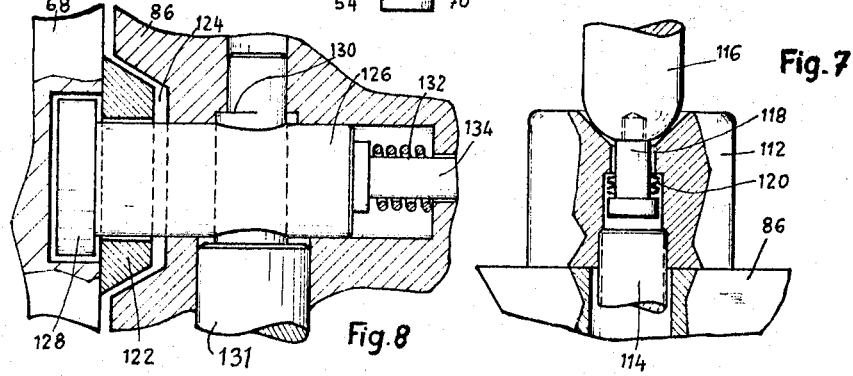
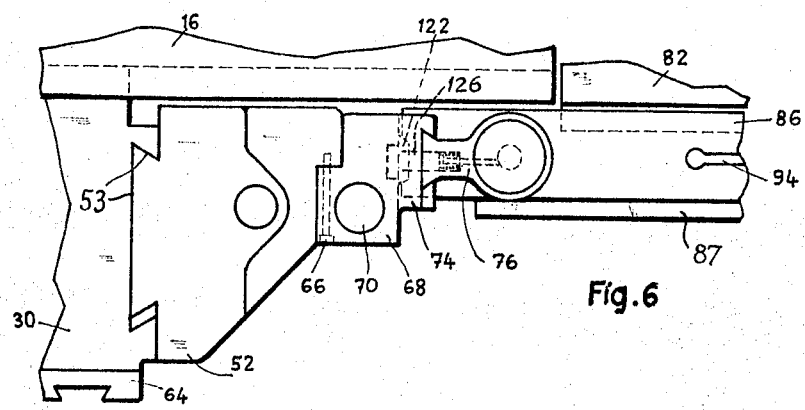

3,266,375
COPYING MILLING MACHINE
Rudolf Reeber, Neukeferloh, and Johann Müller, Munich, Germany, assignors to Hans Deckel, Munich, Germany, and Friedrich W. Deckel, Zug, Switzerland
Filed Mar. 19, 1965, Ser. No. 441,173
Claims priority, application Germany, Mar. 26, 1964, D 44,017
17 Claims. (Cl. 90—13.1)

This invention relates to a copying milling machine, that is, a machine for reproducing on a work piece the configuration or shape determined by a pattern or template. Such machines in general are well known.

An object of the present invention is the provision of a generally improved and more satisfactory machine of this kind.

Another object is the provision of an improved copying milling machine in which the roughing operation on the work is performed by power feed means controlled by a tracer which engages the pattern or template, and in which the power feed parts can be quickly disconnected or made inoperative to permit the final finishing operation to be performed by hand in a most convenient and easy manner.

Still another object is the provision of a machine so designed as to give improved rigidity and sturdiness as compared with prior machines, and at the same time an improved lay-out or arrangement of work table and pattern or template table with relation to each other, to enable the work and the template to be located in position more convenient to each other and more convenient to the location of the operator.

A further object is the provision of a simple, sturdy, and compact copying milling machine so designed as to accommodate an increased size of work piece as compared with many prior machines, and one in which the milling operation is performed at a convenient location with relation to the eyes of the operator, notwithstanding that different work pieces operated upon at different times may have considerably different vertical dimensions.

A still further object is the provision of a copying milling machine so designed and constructed that transmission of vibrations from the work piece and the milling spindle to the tracer is reduced to a minimum.

These and other desirable objects may be attained in the manner disclosed as an illustrative embodiment of the invention in the following description and in the accompanying drawings forming a part hereof, in which:

FIG. 5 is a fragmentary elevational view of the work spindles and the tracer carrier and the connection between them, with parts broken away;

FIG. 6 is a top plan view of the parts shown in FIG. 5;

FIG. 7 is a detail partly in elevation and partly in vertical section of the control element and the connection between it and the tracer carrier; and FIG. 8 is a fragmentary view in horizontal section illustrating details of the connection between the spindle carrier and the tracer carrier.

The machine frame comprises a base plate 10 having a main column 12 rising from the rear end of the base plate, and an auxiliary column 14 extending upwardly from the front end of the base plate. The two columns are connected to each other at their tops by a horizontally extending member 16 which may conveniently be called a crosshead which is firmly bolted or screwed to the upper ends of both columns, and the auxiliary column 14 is firmly bolted or screwed to the base plate. The main column 12 may also be bolted or screwed to the base plate, or if preferred it may be cast integrally with the base plate, as is possible also with the auxiliary column 14.

Figure 3:
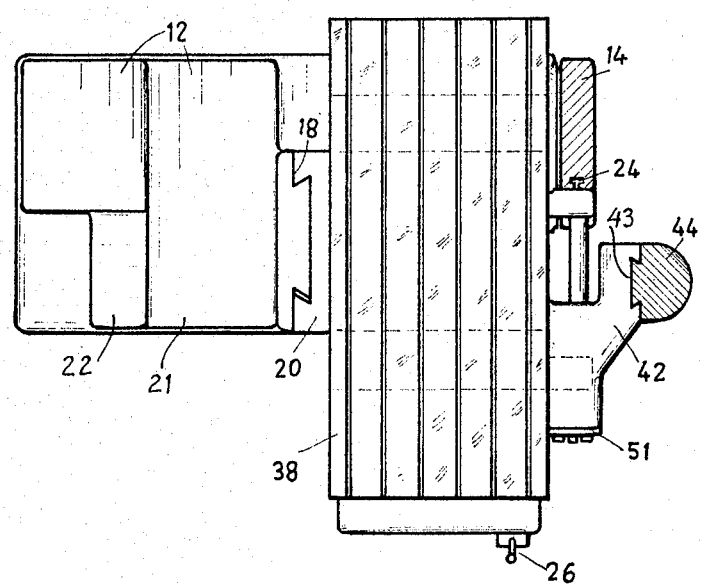
FIG. 3 is a view partly in plan and partly in horizontal section along the line III—III of FIG. 1.
Figure 4:
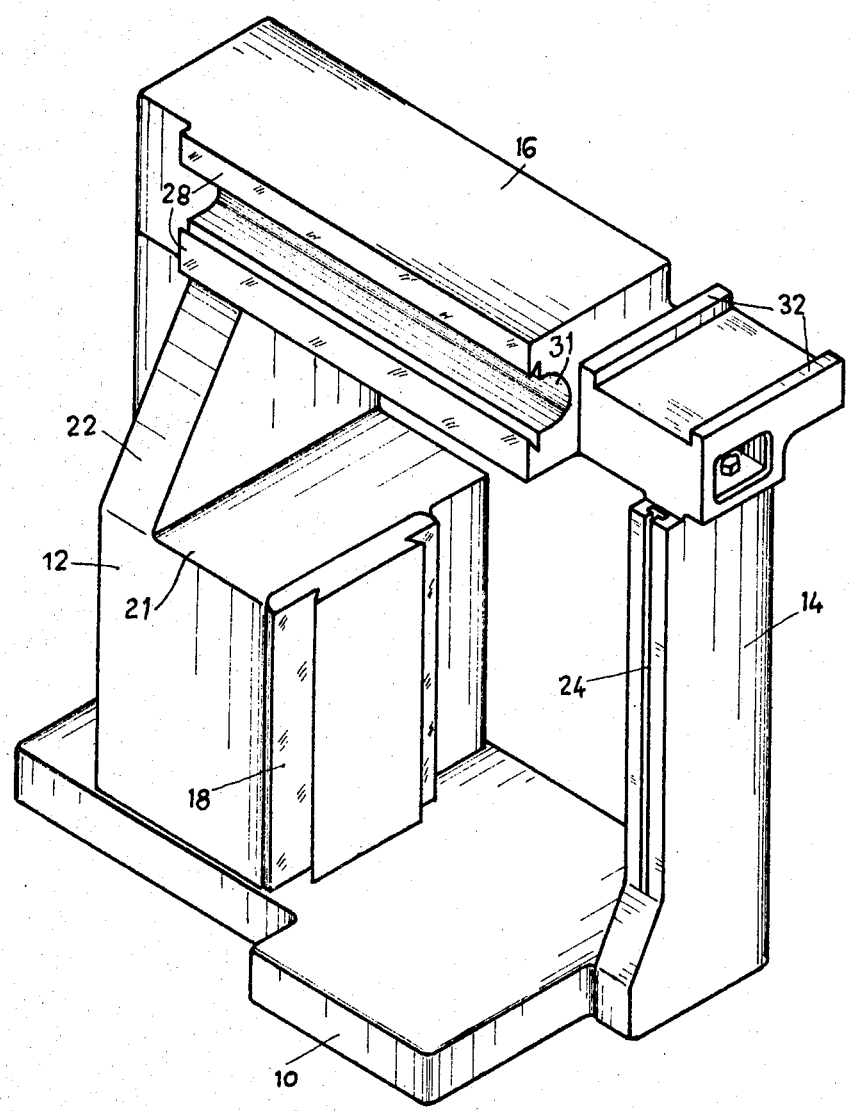
FIG. 4 is a perspective view of the principal frame parts of the machine shown in FIGS. 1–3.

On the front face of the main column 12, facing the auxiliary column 14, there are provided vertical guideways 18 on which a knee member 20 is vertically slidable. The vertical guideways 18 extend only part way up the height of the column 12, and at approximately the level of the upper end of the guideways, the column is recessed or cut back as at 21, and then continues on upwardly in a narrower portion 22 on which the rear end of the crosshead 16 rests. The auxiliary column 14 has a horizontal cross section in the form of a long narrow rectangle (or an elongated oval, if preferred) with its long axis extending parallel to the front face of the main column 12. In the narrow side of the column 14, as seen particularly in FIGS. 1, 3, and 4, there is a vertical groove 24 in which the forward end or free end of the knee member 20 may be clamped fast, clamping being effected by a hand operated clamping lever 26 which operates conventional clamping mechanism to clamp the knee not only in the groove 24 of the column 14, but at the same time to clamp it fast in its vertical guideway 18.

The crosshead 16 has at one side a vertical face provided with a horizontal guideway 28 for slidably receiving a gear box 30 which travels horizontally along this guideway. The guideway has a horizontally extending recess 31 to provide space for a conventional hydraulic cylinder (not shown) which furnishes the power for moving the gear box 30 horizontally along the guideway. At its forward end, the top surface of the crosshead 16 is provided with guideways 32 (FIG. 4) which extend horizontally at right angles to the direction of the guideway 28, and which serve to support a carriage 34 (FIGS. 1 and 2) on which the tracer mechanism is mounted as will further appear below.

The knee 20 can be raised and lowered along the vertical guideway 18 in the customary conventional manner, either by a conventional screw spindle (not shown) or by a conventional hydraulic cylinder, indicated at 36. On the top of the knee is the work table 38 on which the work is mounted, this table being sometimes referred to herein as the mounting table. The table 38 is displaceable horizontally in a longitudinal direction along guideways 40 on the top of the knee 20. It will be noted from FIG. 1 that these guideways lie in a plane which is inclined or tilted somewhat so that the longitudinal side of the table 38 which faces the auxiliary column 14 can be made of considerable depth in order to provide a suitable surface of sufficient height to which another knee 42 is fastened, as seen especially in FIGS. 1 and 3. The knee 42 carries a vertical guideway 43 in which is vertically slidable a post 44 carrying a template table or pattern table 46. Between the post 44 and the table 46 there is a conventional compound slide 48, 50, with its respective guideways arranged horizontally at right angles to each other. Thus the pattern or template table 46, supported from the work table 38, is capable of movement relative to the table 38 in three coordinate directions mutually perpendicular to each other. The work table itself, however, is capable of movement only in two directions, the vertical direction up or down the guideway 18 and the longitudinal horizontal direction along the guideway 40. Any movement of the work table 38 carries the template table 46 with it, but the template table can also move independently, as above indicated. All of the movements of both tables along the respective guideways are performed by conventional feed mechanism of known form, not shown. The feeding movements may be hand operated or power operated. Push buttons or other suitable conventional switches for controlling any of the power operated feeding movements may be mounted on a switchboard 51 fastened to the knee 42 as seen in FIGS. 1–3.

As above mentioned, the gear box 30 is mounted on the horizontal guideway 28 on one side of the crosshead 16 and is moved horizontally along the guideway by a conventional hydraulic cylinder. On that side of the gear box 30 which faces the auxiliary column 14, there is provided a spindle head 52 (FIGS. 1, 2, 5, and 6) mounted for vertical movement along the vertical guideway 53 on the gear box. The spindle head 52 itself is of conventional construction and carries a conventional main spindle 54 driven through conventional intermediate drive mechanism from the electric motor 56. As usual, the spindle 54 is adapted to hold detachably and interchangeably any suitable tool such as a milling cutter for operating upon the work which is held on the table 38. The speed of rotation of the spindle is adjustable by control members 58 and 60 on one face of the gear box 30, these control members operating in conventional known manner on the conventional driving gearing which is within the gear box and which is not shown, since it is well known in the art.

Figure 1:
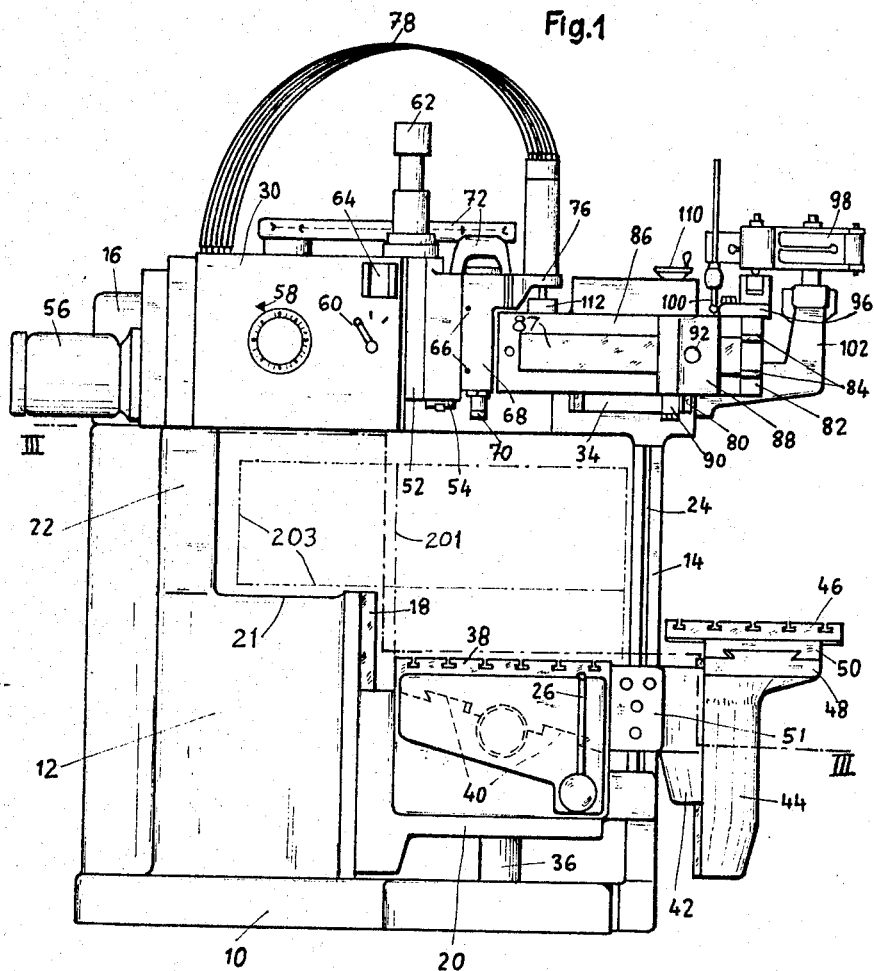
FIG. 1 is a side elevation of a copying milling machine in accordance with a preferred embodiment of the invention.
Figure 2:
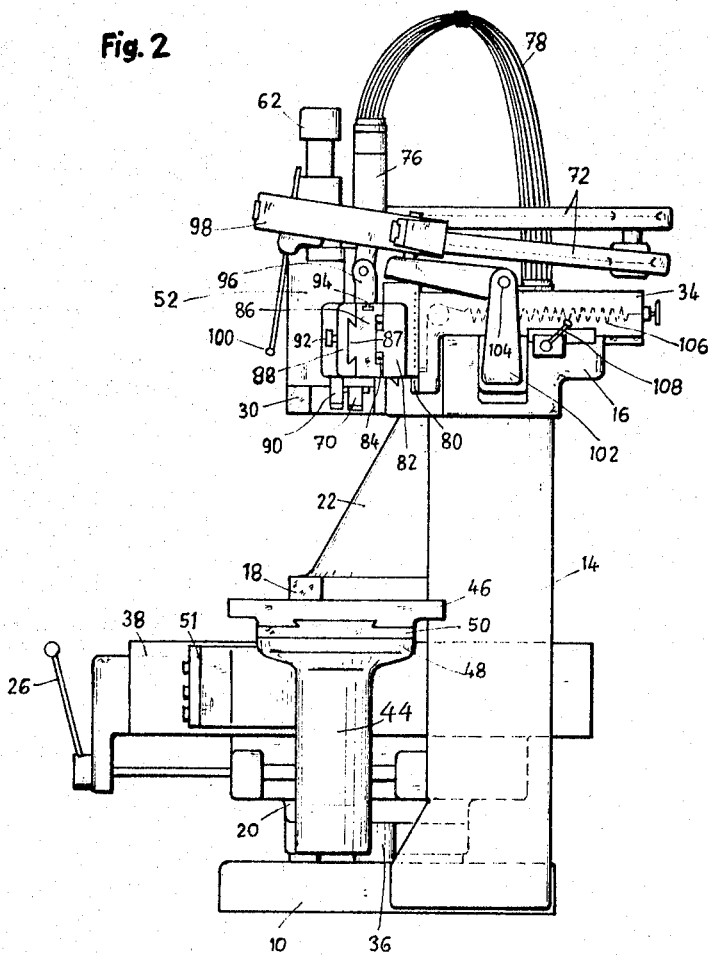
FIG. 2 is a front elevation of the same.

As seen in FIGS. 1 and 2, there is a hydraulic cylinder 62 mounted at the top of the gear box 30, the piston of which is connected to the spindle head 52. This hydraulic cylinder serves to adjust the spindle head and the parts connected with it (as described later) up or down the vertical guideway 53 on the box 30. On the same vertical face of the gear box 30 on which the control members 58 and 60 are mounted, there is also a receiving device or socket 64 (FIG. 1) the purpose of which will be explained below.

The spindle 54 in the spindle head 52 is the main milling spindle. Detachably connected to the spindle head 52 as by means of screws 66 is a housing or head 68 of another tool spindle 70 which may be described as the finishing spindle, a tool mounted in this spindle being conveniently used when performing a fine finishing operation on the work. The finishing spindle 70 is driven by an angle belt drive of conventional kind within the elongated housings 72, deriving power from the connection at the top of the gear box 30. Preferably the belt drive 72 is provided with a conventional adjustable transmission ratio. On the housing or head 68 of the finishing spindle there is mounted a receiving device or socket 74 (FIGS. 5 and 6) for detachably receiving and holding a hydraulic control element 76 which is operatively connected by the flexible multiple hose assembly 78 to the hydraulic system arranged in the crosshead 16. For certain operations, the hydraulic control element 76 is seated in and supported by the receiving device or socket 74, and this is its operative position when milling is being performed by the power feed or power control mechanism. When a fine finishing operation is to be performed by hand, using a milling tool in the finishing spindle 70, as described in more detail below, then the hydraulic control element 76 is lifted out of the holder or socket 74 and is placed in the duplicate holder or socket 64 where it is out of the way and does not interfere with the hand-operated finishing operation.

It has been mentioned above that there is a carriage 34 (FIGS. 1 and 2) displaceable horizontally in a longitudinal direction along the guideways 32 (FIG. 4) on the front end of the crosshead 16, approximately over the auxiliary pedestal 14. This carriage 34 has at one end vertical guideways 80 (FIGS. 1 and 2) along which is vertically movable a beam 82 which, in turn, has horizontal guideways 84 along which a carriage 86 is horizontally movable. Thus the carriage 86 and parts supported thereby are capable of movement in three coordinate directions mutually perpendicular to each other, the two horizontal directions at right angles to each other being along the respective guideways 32 and 84, and the vertical movement being along the guideway 80. On a horizontally extending dovetail guide 87 formed on the vertical face of the carriage 86, a holder 88 for the tracer or stylus 90 is displaceable, and it can be clamped fast in any desired position by a clamp screw 92.

On the top surface of the horizontal carriage 86 there is a T-groove 94 (FIGS. 2 and 6) for fastening a connecting member 96 by means of which the horizontal carriage 86 is operatively connected with a conventional pantograph 98 which has an operating handle 100 and which is supported from a stationary bearing pedestal or bracket 102 and swingable upwardly and downwardly on the horizontal axis 104 on this bracket. The weight of the parts movable vertically in the guideway 80, namely, the weight of the beam 82, carriage 86, holder 88, tracer 90, and possibly part of the weight of the pantograph 98, is counterbalanced by an adjustable spring 106 schematically shown in FIG. 2. The carriage 34 can be clamped fast in any desired position on the guideway 32 by means of a toggle clamping lever 108 (FIG. 2). In order to limit the vertical movement of the beam 82, there is an adjustable stop or abutment controlled by the handwheel 110 (FIG. 1).

Through the connections above described, the pantograph may be used to move the carriage 86 to any desired position (always parallel to itself) in the three coordinate directions above mentioned. This is done by grasping the pantograph handle 100. Because of the leverage effect produced by the pantograph, comparatively little force is needed, and a very fine and accurate control of the movements of the carriage 86 is achieved.

On the carriage 86, as shown especially in FIGS. 5–7, a centering piece or socket 112 is detachably fastened by means of a screw 114 which comes up through the carriage 86 from the bottom thereof (see especially FIG. 5) and which is threaded at its upper end into a tapped opening in the member 112 so as to clamp the member 112 firmly down onto the horizontal top surface of the carriage 86. In a conical countersink in the top of the member 112, this member receives the semi-spherical tip of a control feeler 116 which forms part of the control element 76 previously mentioned. Deflection of the feeler 116 in the three coordinate directions with respect to the control member 76 produces, in known manner, the corresponding control impulses for the hydraulic system, the impulses being transmitted in known manner from the control member 76 through the flexible connections 78 to the hydraulic control system of the machine. The feeler 116 is connected by a bolt 118 to the centering piece 112, as shown in FIG. 7, a spring 120 being engaged around the bolt 118 and pulling downwardly on the bolt so as to keep the semi-spherical lower end of the member 116 seated in the conical socket at the top of the member 112. This connection permits slight angular movements between the control feeler 116 and the centering piece 112, and has spring resilience in case of over-straining or jamming. Otherwise, however, it transmits all movements of the horizontal carriage 86 precisely to the control feeler 116.

Referring now especially to FIG. 8, there is provided means for operatively connecting the horizontal carriage 86 firmly to the finishing spindle housing or head 68, this firm connection being established when it is desired to control the finishing spindle by hand, as for example when performing a fine finishing operation. For this purpose the finishing spindle head 68 has a vertical strip 122, of trapezoidal cross section, projecting from the face of the housing 68 which is toward the carriage 86. It is of a size to fit snugly and wedgingly into a trapezoidal vertical groove 124 in the adjacent end face of the carriage 86. A bolt 126 is supported with some play in a bore in the carriage 86, and has a head 128 which lies behind the clamping strip or fit strip 122, as will be readily understood from FIG. 8.

This bolt 126 has a transverse opening through which extends an eccentric portion 130 on a rotary clamping member 131 extending inwardly from the exposed face of the carriage 86 and provided with a socket for receiving a wrench. A spring 132 surrounds a reduced part 134 of the bolt 126 and tends to move the bolt in a leftward direction when viewed as in FIG. 8, thereby tending to release any rightward pressure on the members 68 and 122. However, when the rotary clamping member 131 is turned by means of a wrench applied to the accessible end thereof, the eccentric 130 draws the bolt 126 rightwardly against the force of the spring 132, and thus draws the fit strip or clamping strip 122 rightwardly to clamp or wedge it firmly in the groove 124, likewise drawing the finishing spindle head 68 with it, since the strip 122 is firmly fixed to the spindle head. In this way, the finishing spindle head or housing 68 becomes rigidly connected to the adjacent end of the carriage 86.

An interlock is provided to prevent the spindle housing 68 from being rigidly clamped to the carriage 86 so long as the control element 76 is in its operative position. This interlock is formed by extending the portion 134 of the bolt 126 so that the end of the portion 134 is blocked by the screw or bolt 114 so long as the screw 114 is screwed home to the position which clamps the centering piece 112 to the carriage 86. When the screw 114 is loosened, however, to remove the piece 112 from the carriage 86, the screw 114 drops down to a position where a circumferential groove 136 in this screw comes opposite the end 134 of the bolt 126. Then the bolt may be operated by the eccentric 130 to clamp the spindle housing 68 to the carriage 86. The screw 114 cannot be screwed upwardly again, to fasten the part 112 to the carriage 86, until the bolt 126 has first been loosened to permit the desired looseness or play between the finishing spindle head 68 and the carriage 86, as is necessary when it is desired to control the movements of the milling spindle 54 by the hydraulic control mechanism.

*Hydraulically controlled milling operation*

When operating the machine for hydraulically controlled copying milling, the control element 76 is placed in the receiving device or socket 74, so that it is rigidly attached to the spindle head 68 which, in turn, is rigidly attached to the main milling spindle head 52 by means of the screws 66. Thus the control device 76 becomes rigidly attached to the main spindle housing 52. The centering piece 112 is rigidly attached to the carriage 86 by means of the screw or bolt 114, the connection between the carriage 86 and the spindle housing 68 first being loosened by appropriately turning the eccentric 130. It will be remembered from the previous part of the description that the tracer or stylus socket 90 is carried by the carriage 86, clamped in fixed relation thereto, although it can be shifted and reclamped to any one of various different positions thereon. The carriage 86, which may also be called a tracer or stylus carrier, is now free for slight movements with respect to the spindle housing, and therefore with respect to the control device 76, since the latter is rigidly connected to the spindle housing. These movements, which are the control movements for the hydraulic system, are of the order of magnitude of 0.1 millimeter, which is sufficient to move the feeler or probe 116 enough, with respect to the part 76, to give the necessary control impulses to the hydraulic system. Now by means of the handle 100 on the pantograph 98, the pantograph is turned to apply displacing force manually to cause the tracer or stylus in the holder 90 to move over any desired part of the surface of the template or pattern which has previously been mounted on the template table 46. Movement in any direction of the carriage 86, will displace the feeler 116 in a corresponding direction, thereby sending the necessary impulse to the conventional hydraulic system to cause the main spindle head 52 to move correspondingly in the same direction. If the movement of the tracer or stylus is to the right or left when viewed as in FIG. 1, the hydraulic system will be operated to move the gear box 30 to the right or to the left as the case may be, so that the tool in the main milling spindle 54 moves right or left correspondingly to the tracer. If the movement of the tracer is up or down, the tool spindle is moved up or down by the hydraulic cylinder 62. If the movement of the tracer is to the right or left when viewed as in FIG. 2, which corresponds to movement toward or away from the plane of the paper in FIG. 1, the hydraulic system moves the work table 38 horizontally in the corresponding direction, along the guideways 40. For convenience, this latter movement of the table 38 along the guideways 40 may be called the longitudinal movement, while the horizontal movement at right angles thereto, moving the gear box 30 along the guideways 28, may be called the transverse movement.

If it is desired, during the rough milling operation with the main spindle 54, to operate across the template or pattern in a series of successive lines. sometimes called a line-by-line milling operation, then the carriage 34 is held against any movement in the above mentioned longitudinal direction, by clamping it by means of the clamp 108. The tracer or stylus in the holder 90 can then move only in the transverse horizontal direction or in the vertical direction, and cannot move in the horizontal longitudinal direction. When one line across the work piece has been milled, the work table 38 is then fed longitudinally through its line-by-line feed, to bring the next line into proper relation to the milling spindle. Since the pattern table 46 is connected to the work table 38, the pattern table will also be fed to the next line, ready for engagement of the next line of the template with the tracing stylus. In the same manner, one can also operate with the finishing spindle 70, in which case the horizontal transverse movement and the vertical movement of the spindle housing 68 are controlled hydraulically.

*Finishing by hand*

When it is desired to obtain the highest quality surface on the work, finishing it by hand rather than by automatic hydraulic control, the control member 76 with its feeler 116 are removed from the socket or holder 74 and are shifted to the duplicate socket or holder 64, where the parts 76 and 116 rest in an ineffective or inoperative position, out of the way of the operator. Before doing this, the screw or bolt 114 is unscrewed so that the centering piece 112 may be lifted off of the top surface of the carriage 86. Because of the bolt connection 118, the piece 112 is connected permanently, although loosely, to the feeler 116 and must be released from the carriage 86 when the feeler 116 and control member 76 are to be shifted to the other holding bracket 64. The carriage or tracer carrier 86 is now firmly connected with the finishing spindle housing 68 by turning the eccentric 130, and the finishing spindle housing or head 68 is disconnected from the main spindle head 52 by removing the fastening screws 66. The spindle head 52 is then separated from the finishing spindle head 68, and the gear box 30 can be moved out of the way, toward the left when viewed as in FIG. 1, so that it does not interfere with the desired hand-controlled movements of the finishing spindle head 68, which now has free room for movement in all directions. The finishing operation is then performed, by manual pressure applied to the handle 100 of the pantograph 98, the pantograph having a leverage effect which increases the force applied to move the tool spindle, as compared with the manual force applied to the handle 100. Thus the milling operation can proceed readily, under hand control, in all desired directions. When milling by the main tool spindle 54, movement of the milling spindle itself can occur only in the transverse horizontal direction and in the vertical direction, any milling in the longitudinal horizontal direction being accomplished by longitudinal movement of the table 38, since the main spindle 54 cannot move in this direction. But when milling by hand, by the use of the finishing or supplemental spindle 70, this spindle is movable in all three coordinate directions (after it has been disconnected from the main spindle head 52) along with the carriage 86 which likewise moves in all three coordinate directions, and thus it is not necessary to move the carriage 38 during the hand finishing operation, except as may be required to bring a different part of the work and the pattern within the range of horizontal longitudinal movement of the spindle 70 and tracer 90, this range of horizontal longitudinal movement being somewhat more limited than the maximum range of horizontal longitudinal movement of the work table 38 and template table 46 along the guideways 40.

A copying milling machine constructed as herein disclosed has many advantages. Some of the features of construction above described have been used in prior milling machines, but so far as is known at the present, these features have never before been combined into a single machine capable of such versatile work and having such convenience and ease of operation as the present machine.

The general arrangement of the present machine is particularly satisfactory in enabling the machine to accommodate a wide variety of sizes and shapes of work. The work can be of indefinite length, since it can overhang the table 38 at either end. If the work piece is narrow enough to fit between the vertical guideway 18 and the supplementary or auxiliary column or frame member 14, then it can be of considerable height, since the work table 38 can be dropped downwardly along the guideway 18 to allow ample vertical space for a high work piece, as shown by the broken lines 201 in FIG. 1. On the other hand, if the work piece has greater width than will fit between the guideway 18 and the colume 14, but not so much height, the work table 38 can be raised until its surface is slightly above the top of the guideway 18, and then the work piece can overhang the left edge of the work table when viewed as in FIG. 1, as seen by the broken lines 203. But the placing of the vertical guideway 18 in the location shown, instead of placing it further to the left, enables a more rigid and sturdy support of the knee 20 and the work table, since there is less overhang of the knee and work table to the right of the guideway 18 than there would be if the guideway were moved further to the left. During milling operation, the work table does not perform vertical movements, the relative vertical movement between the milling spindle and the work being performed by vertical movements of the spindle rather than the table. Therefore, the table can be clamped both to the vertical guideway 18 and to the slot 24 in the auxiliary column, resulting in a particularly rigid holding of the work.

During milling operations, it is not necessary, when milling along any one particular line, to move the tables or the work or the template, since the line milling operation is performed by moving the tracer mechanism and the milling spindle relative to the stationary work and stationary template. Thus the parts to be moved during a milling operation are much lighter than would be the case if movement of either work or the template were necessary. This enables less energy to be expended in performing the milling, as well as a more accurate and easy control of the operation.

Moreover, the machine is so designed that the operator has a good view of both the template and the work, in the region where the template is being traced and the work is being milled, at all times. Although an auxiliary column 14 is provided for adding to the rigidity of the machine, this auxiliary column is so shaped and so placed that it does not obstruct the position of the operator or his vision of the template and work. The work table 38 is raised or lowered as may be necessary in order to bring the part of the work which is being milled to a convenient eye level for the operator. The template on the table 46 moves upwardly and downwardly with the main work table 38, but can also be moved vertically independently of the work table, to bring it to a convenient elevation, as for example in cases where the work piece itself is quite thick from top to bottom and where the template or pattern may be much thinner from top to bottom.

The operator can stand wherever is most convenient for him. In the foregoing description, the end of the machine seen in FIG. 2 (which is the end at the right of FIG. 1) has sometimes been described as the front of the machine, and the part viewed in FIG. 1 has sometimes been described as the side of the machine. These expressions, however, are used merely for convenience of description, and the face of the machine shown in FIG. 1 could equally well be called the front. The operator may stand here, facing the longitudinal end of the table 38, in the vicinity of the clamping control lever 26, or he may stand at either the longitudinal edge or the lateral edge of the template table 46, depending upon his preference and upon the particular milling operation being performed. In any case, he is close to the things which are to be observed.

In the machine as illustrated and described above, there is a relatively small horizontal distance between the milling spindle 54 and the horizontal guideway 28 on which the gear box 30 travels, so that there is a very satisfactory support for the milling spindle. There is also a relatively small distance between the axis of the milling spindle and the vertical guideway on the face of the gear box 30, along which the spindle head moves vertically. This latter distance can be still further reduced and an even more satisfactory support for the main spindle can be provided if the spindle is arranged in an axially displaceable quill surrounded on all sides by the gear box. If this is done, then the releasable driving connection is arranged between the quill and the tracer carriage 86.

Another noteworthy feature of the present construction is that the drive-type fastening or connection between the spindle head and the tracer carrier 86 is developed as a cardan-type connection with play, so that much of the vibration of the spindle head is not transmitted to the tracer carrier 86, thus resulting in a substantially quieter and more precise operation of the tracing stylus.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A copying milling machine comprising an upstanding main column, an upstanding auxiliary column spaced from the main column, a work table in the space between said two columns, said table being mounted for vertical movement and also longitudinal horizontal movement, a substantially horizontal crosshead resting on and bridging the space between said column, a vertical milling spindle head supported from said crosshead and displaceable horizontally thereon in a direction transverse with respect to the direction of longitudinal movement of said work table, and a template table spaced laterally from said work table and located at least partly on the opposite side of said auxiliary column from said work table, said template table being operatively connected to said work table to move therewith during both the vertical movements and the longitudinal horizontal movements of said work table.

2. A construction as defined in claim 1, further including a vertical guideway on said main column, and a knee mounted on and movable vertically along said guideway and projecting from said guideway in the general direction toward said auxiliary column, said work table being mounted on said knee to move upwardly and downwardly therewith.

3. A construction as defined in claim 2, further including means for clamping said knee fast to said auxiliary column.

4. A construction as defined in claim 1, in which said auxiliary column has a horizontal cross sectional shape which is relatively long in a direction parallel to the direction of longitudinal horizontal movement of said work table and relatively narrow in a transverse direction toward and away from said main column.

5. A construction as defined in claim 1, in which said template table, in addition to moving bodily with said work table, is also mounted for adjusting movement independently of said work table in three coordinate directions mutually perpendicular to each other.

6. A construction as defined in claim 1, in which said template table is mounted on a knee fastened to that side of said work table which is faced toward said auxiliary column.

7. A construction as defined in claim 1, further including a vertical guideway on the lower part of that side of said main column which is faced toward said auxiliary column, and a knee mounted on and movable vertically along said guideway, said work table being mounted on said knee to move upwardly and downwardly therewith, the side of said main column which is faced toward said auxiliary column being offset in a direction away from said auxiliary column, at an elevation above the top of said guideway, to provide space for receiving a large flat workpiece which overhangs the side of said work table toward said main column.

8. A copying milling machine comprising an upstanding main column, an upstanding auxiliary column spaced from the main column, a work table in the space between said two columns, said table being mounted for vertical movement and also longitudinal horizontal movement, a substantially horizontal crosshead resting on and bridging the space between said columns, said crosshead having a vertical longitudinal side extending transversely to the direction of longitudinal movement of said work table, a template table spaced laterally from said work table and located at least partly on the opposite side of said auxiliary column from said work table, said template table being operatively connected to said work table to move therewith during both the vertical movements and the longitudinal horizontal movements of the work table, a guideway extending horizontally along said vertical longitudinal side of said crosshead, a gear box mounted for horizontal movement along said guideway on said crosshead, a vertical guideway on said gear box, and a milling spindle carrier mounted for vertical movement along said vertical guideway.

9. A construction as defined in claim 8, further including a template tracer carrier mounted for movement at least vertically and in the same horizontal direciton as said horizontal guideway on said crosshead, and a drive-type connection between said tracer carrier and said spindle carrier, said drive-type connection being active at least in said vertical direction and said horizontal direction, said connection including a control feeler activated by limited relative movement between said tracer carrier and said spindle carrier so that said control feeler may control power-operated movements of said spindle carrier vertically and said gear box in said horizontal direction.

10. A construction as defined in claim 9, in which said template tracer carrier is mounted on said crosshead.

11. A construction as defined in claim 8, further including a horizontal guideway on said crosshead extending in a direction at right angles to said first mentioned guideway thereon, a carriage mounted for horizontal movement thereon, a beam mounted for vertical movement on said carriage, a template tracer carrier mounted for horizontal movement on said beam in a direction parallel to the direction of movement of said gear box along said first mentioned guideway on said crosshead, and an operative connection between said template tracer carrier and said spindle carrier for controlling movement of said spindle carrier in two directions from movement of said tracer carrier.

12. A copying milling machine comprising an upstanding main column, an upstanding auxiliary column spaced from the main column, a work table in the space between said two columns, said table being mounted for vertical movement and also longitudinal horizontal movement, a substantially horizontal crosshead resting on and bridging the space between said columns, said crosshead having a vertical longitudinal side extending transversely to the direction of longitudinal movement of said work table, a template table spaced laterally from said work table and located at least partly on the opposite side of said auxiliary column from said work table, said template table being operatively connected to said work table to move therewith during both the vertical movements and the longitudinal horizontal movements of the work table, a guideway extending horizontally along said vertical longitudinal side of said crosshead, a gear box mounted for horizontal movement along said guideway on said crosshead, a vertical guideway on said gear box, a main spindle carrier mounted for vertical movement along said vertical guideway, a template tracer carrier mounted on said crosshead for movement vertically and at least in the same horizontal direction in which said gear box moves along its guideway on said crosshead, a finishing spindle carrier, means for detachably fastening said finishing spindle carrier rigidly to said main spindle carrier, means for selectively connecting said tracer carrier to said finishing spindle carrier either rigidly or loosely with limited play, and feeler means operated by relative play movement between said tracer carrier and said finishing spindle carrier when said finishing spindle carrier is rigidly fastened to said main spindle carrier, said feeler means controlling movement of said gear box, horizontally along said crosshead and movement of said main spindle carrier vertically on said gear box, said feeler means being inoperative when said finishing spindle carrier is detached from said main spindle carrier and is rigidly fastened to said tracer carrier, so that movements of said finishing spindle carrier may then be performed directly by manual movement of said tracer carrier.

13. A construction as defined in claim 12, further including interlocking means preventing establishment of a rigid connection between said finishing spindle carrier and said main spindle carrier until said feeler means has first been made inoperative, and preventing operativeness of said feeler means until the connection between said main spindle carrier and said finishing spindle carrier has first been made loose.

14. A copying milling machine comprising a work table, a template table, a main milling spindle carrier mounted for movement relative to said work table vertically and in at least one horizontal direction, a template tracer carrier mounted for movement relative to said template table vertically and in at least the same horizontal direction in which said main spindle carrier is movable, a control element including a movable feeler operated by relative movement between said main spindle carrier and said tracer carrier for controlling movement of said main spindle carrier relative to said work table, a finishing spindle carrier, means mounting said finishing spindle carrier on said tracer carrier selectively either rigidly or loosely with play, and means detachably connecting said finishing spindle carrier rigidly to said main spindle carrier to serve as a loose connection between said tracer carrier and said main spindle carrier when said finishing spindle carrier is connected loosely to said tracer carrier.

15. A construction as defined in claim 14, further including means for rendering said control element inoperative, and interlocking means requiring said control element to be made inoperative before the mounting of said finishing spindle carrier on said tracer carrier may be changed from a loose mounting to a rigid mounting, and requiring a rigid mounting of said finishing spindle carrier on said tracer carrier to be changed to a loose mounting before said control element may be made operative.

16. A construction as defined in claim 14, further including pantograph means operatively connected to said tracer carrier to move said tracer carrier by movement of said pantograph means.

17. A construction as defined in claim 14, in which said tracer carrier is supported for movement parallel to itself in three coordinate directions mutually perpendicular to each other.

No references cited.

WILLIAM W. DYER, Jr., *Primary Examiner.*

G. A. DOST, *Assistant Examiner.*